US00RE45627E

(19) United States
(12) Reissued Patent
Chong et al.

(10) Patent Number: US RE45,627 E
(45) Date of Reissued Patent: Jul. 28, 2015

(54) RE-KEYABLE LOCK CYLINDER

(75) Inventors: Gerald Chong, Rowland Heights, CA (US); Steven Armstrong, San Juan Capistrano, CA (US)

(73) Assignee: KWIKSET CORPORATION, Foothill Ranch, CA (US)

(21) Appl. No.: 12/044,434

(22) Filed: Mar. 7, 2008

Related U.S. Patent Documents

Reissue of:
(64) Patent No.: 7,007,528
Issued: Mar. 7, 2006
Appl. No.: 10/815,289
Filed: Apr. 1, 2004

(51) Int. Cl.
*E05B 29/04* (2006.01)
*E05B 29/00* (2006.01)

(52) U.S. Cl.
CPC ..... *E05B 29/004* (2013.01); *E05B 29/0066* (2013.01); *E05B 29/0073* (2013.01)

(58) Field of Classification Search
CPC ... E05B 27/00; E05B 27/0007; E05B 27/001; E05B 27/0014; E05B 27/0017; E05B 27/0021; E05B 27/0035; E05B 27/0046; E05B 27/005; E05B 27/0053; E05B 27/0067; E05B 27/0075; E05B 27/0082; E05B 27/0085; E05B 27/0089; E05B 27/02; E05B 29/00; E05B 29/0026; E05B 29/004; E05B 29/0046; E05B 29/0066; E05B 29/0073; E05B 29/008; E05B 31/00; E05B 35/08; E05B 35/083; E05B 35/10; E05B 35/105
USPC ..... 70/337–343, 382–385, 368, 492–496
See application file for complete search history.

(56) References Cited

U.S. PATENT DOCUMENTS

| | | | |
|---|---|---|---|
| 1,565,556 | A | 12/1925 | Fremon |
| 1,610,224 | A | 12/1926 | Dalboni et al. |
| 1,965,889 | A | 7/1934 | Fitzgerald |
| 2,007,143 | A | 7/1935 | Keil |
| 2,139,842 | A | 12/1938 | Miller |
| 2,194,469 | A | 3/1940 | Fremon |
| 2,232,017 | A | 2/1941 | Wilder |
| 2,370,862 | A | 3/1945 | Johnstone |

(Continued)

FOREIGN PATENT DOCUMENTS

| | | |
|---|---|---|
| CA | 2043734 | 1/1992 |
| CA | 2043735 | 1/1992 |

(Continued)

OTHER PUBLICATIONS

Mechanical Reprogrammable: Security Cylinder Locks "A Revolution in Conventional Security and Key Control" RIELDA Reprogrammable Security Cylinder Locks.

(Continued)

*Primary Examiner* — Lloyd Gall
(74) *Attorney, Agent, or Firm* — Harness, Dickey & Pierce, P.L.C.

(57) ABSTRACT

A re-keyable lockset that employs pairs of first and second pins. Coupling of the first and second pins to one another defines a key profile for a mating key. A second key with a different key profile may be installed to the lockset when the first and second pins are uncoupled from one another. Thereafter, the first and second pins may be re-coupled to one another to define the key profile of a new mating key. A method for re-keying a lockset is also provided.

19 Claims, 13 Drawing Sheets

(56) References Cited

U.S. PATENT DOCUMENTS 2,391,832 A 12/1945 Johnstone
2,418,080 A 3/1947 Ledin et al.
2,895,323 A 7/1959 Kennedy
2,977,786 A 4/1961 Kendrick et al.
3,059,462 A 10/1962 Check
3,149,486 A 9/1964 Russell et al.
3,183,692 A 5/1965 Check
3,190,093 A 6/1965 Schlage
3,234,768 A 2/1966 Russell et al.
3,261,188 A 7/1966 Kerr
3,320,781 A 5/1967 Hill
3,395,558 A 8/1968 Russell et al.
3,431,757 A 3/1969 Hori
3,589,153 A 6/1971 Hill
3,667,262 A * 6/1972 Hill ..... 70/384
3,667,264 A 6/1972 Surko, Jr. et al.
3,693,384 A 9/1972 Genakis
3,726,116 A 4/1973 Dimotta
3,728,880 A 4/1973 Falk
3,735,612 A 5/1973 Popovici
3,754,422 A 8/1973 Stackhouse
3,910,083 A 10/1975 Burlingame
3,952,562 A 4/1976 Snow
3,961,507 A 6/1976 Falk
3,990,282 A 11/1976 Sorum
3,998,080 A 12/1976 Fane
3,999,413 A * 12/1976 Raymond et al. ..... 70/495
4,015,458 A 4/1977 Mercurio
4,069,694 A 1/1978 Raymond et al.
4,094,175 A 6/1978 Pechner
4,142,391 A 3/1979 Paig
4,191,037 A 3/1980 Patriquin
4,209,782 A 6/1980 Donath et al.
4,232,353 A 11/1980 Mosciatti et al.
4,233,828 A 11/1980 Dauenbaugh
4,320,639 A 3/1982 Kleefeldt et al.
4,372,139 A 2/1983 Laake
4,376,382 A 3/1983 Raymond et al.
4,377,940 A 3/1983 Hucknall
4,393,672 A 7/1983 Gelhard
4,393,673 A 7/1983 Widen
4,398,405 A 8/1983 Patriquin
4,404,824 A 9/1983 Hennessy
4,412,437 A 11/1983 Smith
4,416,129 A 11/1983 Thimot
4,440,009 A 4/1984 Smith
4,444,034 A 4/1984 Best et al.
4,519,228 A 5/1985 Sornes
4,616,492 A 10/1986 Barfield
4,620,429 A 11/1986 Quillen
4,634,822 A 1/1987 Goeke
4,635,453 A 1/1987 Hart
4,648,252 A 3/1987 Dugan
4,672,828 A 6/1987 Theriault
4,689,978 A 9/1987 Drummond
4,703,638 A 11/1987 Bergstrom
4,712,399 A * 12/1987 Mattossovich ..... 70/495
4,712,400 A 12/1987 Steinbach
4,712,401 A 12/1987 Monahan
4,712,402 A 12/1987 Monahan
4,715,201 A 12/1987 Craig
4,729,231 A 3/1988 Wu
4,732,023 A 3/1988 Shen
4,741,188 A 5/1988 Smith
4,747,281 A 5/1988 Monahan
4,765,163 A 8/1988 Trull et al.
4,794,772 A 1/1989 Falk et al.
4,809,525 A 3/1989 Cox
4,836,002 A 6/1989 Monahan
4,848,115 A 7/1989 Clarkson et al.
4,850,210 A 7/1989 Adler et al.
4,858,456 A 8/1989 McGee, Sr.
4,899,563 A 2/1990 Martin
4,901,545 A 2/1990 Bacon et al.
4,909,053 A 3/1990 Zipf, III et al.
4,912,953 A 4/1990 Wobig
4,920,774 A 5/1990 Martin
4,942,749 A 7/1990 Rabinow
4,966,021 A * 10/1990 Boag ..... 70/383
4,996,856 A 3/1991 Lin et al.
5,000,019 A 3/1991 Foster
5,010,753 A 4/1991 Boris, Jr.
5,010,754 A 4/1991 De Angelo et al.
5,024,071 A 6/1991 Shafirkin
5,025,647 A 6/1991 Muus
5,038,589 A 8/1991 Martin
5,044,180 A 9/1991 Lebrecht
5,044,185 A 9/1991 Green
5,070,715 A 12/1991 Smallegan et al.
5,072,604 A 12/1991 Eisermann
5,074,135 A 12/1991 Eisermann
5,076,081 A 12/1991 Boris, Jr.
5,089,692 A 2/1992 Tonnesson
5,103,661 A 4/1992 Fann et al.
5,121,618 A 6/1992 Scott
5,121,619 A 6/1992 Martin
5,168,734 A 12/1992 Duval et al.
5,174,136 A 12/1992 Thwing
5,176,015 A 1/1993 Sussina
5,209,087 A 5/1993 Cox
5,209,088 A 5/1993 Vaks
5,211,044 A 5/1993 Kim
5,226,304 A 7/1993 Scott
5,233,850 A 8/1993 Schroeder
5,267,459 A 12/1993 Sedley
5,279,138 A 1/1994 Gallagher
5,325,690 A 7/1994 Adler et al.
5,375,444 A 12/1994 Smith
5,388,437 A 2/1995 Sedley
5,421,179 A 6/1995 Bergström
5,423,198 A 6/1995 DiVito et al.
5,428,978 A 7/1995 Tsukano
5,431,034 A 7/1995 Fann et al.
5,450,662 A 9/1995 Watts
5,475,998 A 12/1995 Raskevicius et al.
5,487,287 A 1/1996 Viggiano
5,502,990 A 4/1996 Hirvi
5,507,163 A 4/1996 Juang
5,540,071 A 7/1996 Reikher
5,542,273 A 8/1996 Bednarz
5,546,778 A 8/1996 Eisermann
5,552,777 A 9/1996 Gokcebay et al.
5,576,526 A 11/1996 Eisermann
5,606,882 A 3/1997 Larsen et al.
RE35,518 E 5/1997 Sussina
5,640,865 A 6/1997 Widen
5,682,779 A 11/1997 Dolev
5,704,234 A 1/1998 Resch
5,718,136 A 2/1998 Aldieri et al.
5,742,236 A 4/1998 Cremers et al.
5,749,253 A 5/1998 Glick et al.
5,752,400 A 5/1998 Kim
5,758,525 A 6/1998 Goldman
5,765,417 A 6/1998 Bolton
5,771,722 A 6/1998 DiVito et al.
5,778,712 A 7/1998 Walldén
5,791,181 A 8/1998 Sperber et al.
5,819,569 A 10/1998 Herdman
5,823,027 A 10/1998 Glick et al.
5,848,541 A 12/1998 Glick et al.
5,884,512 A 3/1999 Wayne
5,921,121 A 7/1999 Tang
5,921,122 A 7/1999 Lin
5,921,123 A 7/1999 Schwarzkopf et al.
5,966,973 A 10/1999 Watts
5,970,760 A 10/1999 Shen
5,979,200 A 11/1999 Cliff
6,000,609 A 12/1999 Gokcebay et al.
6,005,487 A 12/1999 Hyatt, Jr. et al.
6,012,311 A 1/2000 Duckwall
6,021,655 A 2/2000 Labbe et al.
6,029,484 A 2/2000 Jetton
6,047,577 A 4/2000 Klimas
6,064,316 A 5/2000 Glick et al.

(56) References Cited

U.S. PATENT DOCUMENTS

| | | | | |
|---|---|---|---|---|
| 6,076,386 | A | 6/2000 | Etchells et al. | |
| 6,079,240 | A | 6/2000 | Shvarts | |
| 6,119,495 | A * | 9/2000 | Loreti | 70/340 |
| 6,134,928 | A | 10/2000 | Kang | |
| 6,142,717 | A | 11/2000 | Staiger | |
| 6,263,713 | B1 | 7/2001 | Fantl | |
| 6,295,850 | B1 | 10/2001 | Anderson | |
| 6,301,942 | B1 | 10/2001 | Shvarts | |
| 6,374,653 | B1 | 4/2002 | Gokcebay et al. | |
| 6,382,006 | B1 | 5/2002 | Field et al. | |
| 6,415,523 | B1 | 7/2002 | Wood | |
| 6,425,274 | B1 | 7/2002 | Laitala et al. | |
| 6,490,891 | B1 | 12/2002 | Stringer et al. | |
| 6,516,643 | B1 | 2/2003 | Olshausen | |
| 6,523,378 | B2 | 2/2003 | Kuo | |
| 6,532,782 | B2 | 3/2003 | Chiu | |
| 6,553,800 | B2 | 4/2003 | Doerr et al. | |
| 6,564,601 | B2 | 5/2003 | Hyatt, Jr. | |
| 6,578,396 | B2 | 6/2003 | Field et al. | |
| 6,634,197 | B2 | 10/2003 | Widen et al. | |
| 6,701,761 | B1 | 3/2004 | Chang et al. | |
| 6,718,807 | B2 | 4/2004 | Andersson | |
| 6,748,777 | B1 | 6/2004 | Livingston | |
| 6,755,063 | B2 * | 6/2004 | Takadama | 70/495 |
| 6,776,017 | B2 | 8/2004 | Herdman | |
| 6,860,131 | B2 * | 3/2005 | Armstrong et al. | 70/492 |
| 6,862,909 | B2 * | 3/2005 | Armstrong et al. | 70/492 |
| 6,871,520 | B2 * | 3/2005 | Armstrong et al. | 70/492 |
| 6,951,123 | B2 | 10/2005 | Chong | |
| 6,959,569 | B2 | 11/2005 | Strader et al. | |
| 6,973,813 | B2 | 12/2005 | Erdely | |
| 7,162,901 | B2 | 1/2007 | Williams | |
| 2001/0023602 | A1 | 9/2001 | Doerr et al. | |
| 2001/0047672 | A1 | 12/2001 | Fuller | |
| 2002/0095961 | A1 | 7/2002 | Doerr et al. | |
| 2002/0108413 | A1 | 8/2002 | Hyatt, Jr. | |
| 2002/0170326 | A1 | 11/2002 | Field et al. | |
| 2003/0019257 | A1 | 1/2003 | Simon et al. | |
| 2003/0037582 | A1 | 2/2003 | Edwards, Jr. et al. | |
| 2003/0041630 | A1 | 3/2003 | Laitala et al. | |
| 2003/0084692 | A1 | 5/2003 | Herdman | |
| 2003/0089149 | A1 * | 5/2003 | Suzuki et al. | 70/492 |
| 2003/0136164 | A1 | 7/2003 | Widen et al. | |
| 2003/0154753 | A1 * | 8/2003 | Dimig et al. | 70/495 |
| 2003/0159483 | A1 | 8/2003 | Kondratuk et al. | |
| 2003/0205071 | A1 | 11/2003 | Hyatt, Jr. | |
| 2003/0217576 | A1 | 11/2003 | Koluch | |
| 2004/0011099 | A1 | 1/2004 | Andersson | |
| 2004/0069030 | A1 | 4/2004 | Takadama | |
| 2004/0107751 | A1 | 6/2004 | Hyatt, Jr. | |
| 2004/0159136 | A1 | 8/2004 | Edwards et al. | |
| 2004/0221630 | A1 | 11/2004 | Herdman | |
| 2004/0237612 | A1 | 12/2004 | Nugent | |
| 2005/0016234 | A1 | 1/2005 | Strader et al. | |
| 2005/0034496 | A1 | 2/2005 | Fuller | |
| 2005/0081584 | A1 | 4/2005 | Nugent | |
| 2005/0172687 | A1 | 8/2005 | Segien et al. | |
| 2005/0183482 | A1 | 8/2005 | Lin | |
| 2005/0199027 | A1 | 9/2005 | Mannella | |
| 2006/0117822 | A1 | 6/2006 | Boesel et al. | |
| 2010/0050718 | A1 * | 3/2010 | Boesel et al. | 70/495 |

FOREIGN PATENT DOCUMENTS

| | | |
|---|---|---|
| CA | 1300390 | 5/1992 |
| CA | 2121583 | 4/1993 |
| CA | 2127811 | 7/1993 |
| CA | 1330399 | 6/1994 |
| CA | 2134533 | 4/1996 |
| CH | 150857 | 2/1932 |
| DE | 2062074 | 6/1972 |
| DE | 3443516 | 6/1986 |
| EP | 0157967 | 10/1985 |
| EP | 0210037 | 1/1987 |
| EP | 0352495 | 1/1990 |
| EP | 0591661 | 4/1994 |
| EP | 0663497 | 7/1995 |
| EP | 0872615 | 10/1998 |
| EP | 1375790 | 1/2004 |
| EP | 1411192 | 4/2004 |
| FR | 2477618 | 9/1981 |
| GB | 522385 | 12/1938 |
| GB | 1008908 | 11/1965 |
| GB | 1554877 | 10/1979 |
| GB | 2126647 | 3/1984 |
| GB | 2214557 | 9/1989 |
| HK | 1007781 | 4/1999 |
| JP | 54-005360 | 3/1979 |
| JP | 7197705 | 8/1995 |
| JP | 09132975 | 5/1997 |
| JP | 09235921 | 9/1997 |
| JP | 9235922 | 9/1997 |
| JP | 11117584 | 4/1999 |
| JP | 2001/234648 | 8/2001 |
| JP | 2001/098805 | 10/2001 |
| JP | 2001/323693 | 11/2001 |
| JP | 2003/213988 | 7/2003 |
| JP | 2003/307057 | 10/2003 |
| WO | WO 91/01425 | 2/1991 |
| WO | WO 93/14290 | 7/1993 |
| WO | WO 95/33116 | 12/1995 |
| WO | WO 97/36072 | 10/1997 |
| WO | WO 2004/081322 | 3/2004 |

OTHER PUBLICATIONS

The New Revolution in Cylinder Technology http://www.brinkslynx.com/home.php.

Brinks: LYNX A First Look.

* cited by examiner

RE-KEYABLE LOCK CYLINDER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This application is a Reissue of U.S. Pat. No. 7,007,528 B2, issued Mar. 7, 2006.*

INTRODUCTION

The present invention generally relates to lock cylinders and more particularly to lock cylinders that can be re-keyed without the use of a master key.

When re-keying a cylinder using a traditional cylinder design, the user is required to remove the cylinder plug from the cylinder body and replace the appropriate pins so that a new key can be used to operate the lockset. This typically requires the user to remove the cylinder mechanism from the lockset and then disassemble the cylinder to some degree to remove the plug and replace the pins as necessary. This requires a working knowledge of the lockset and cylinder mechanism and is usually only performed by locksmiths or trained professionals. Additionally, the process usually employs special tools and requires the user to have access to pinning kits to interchange pins and replace components that can get lost or damaged in the re-keying process. Finally, professionals using appropriate tools can easily pick traditional cylinders.

SUMMARY

In one form, the present teachings provide a lock with a lock cylinder body and a plug assembly. The lock cylinder body has a wall member that defines an interior cavity and a first groove that is generally parallel to a longitudinal axis of the interior cavity. The plug assembly is at least partially received in the lock cylinder body and includes a plug, a lock bar, a guide bar, a plurality of first pin members and a plurality of second pin members. The plug has a central cavity, a keyway that is generally aligned to a longitudinal axis of the central cavity, a lock bar slot that intersects the central cavity, and a guide bar slot that intersects the central cavity and which is located opposite the lock bar slot. The lock bar is movable along a first axis between a first position and a second position. At least a portion of the lock bar extends outwardly of the plug into the first groove when the lock bar is in the first position. The lock bar includes at least one lock element that travels from the lock bar slot into the central cavity when the lock bar is moved from the first position to the second position. The guide bar is received in the guide bar slot and is movable relative to the plug between a radially inward position and a radially outward position. The first pin members are disposed in the central cavity and bound an upper side of the keyway. The first pin members are individually movable in a first direction that is generally transverse to the first axis. The first pin members also coupled to the guide bar so as to be collectively movable with the guide bar when the guide bar is moved into the radially outward position. Each of the second pin members is received in the central cavity, includes a mating lock element and is coupled to a respective one of the first pin members when the guide bar is in the radially inward position. Each of the second pin members is uncoupled from the respective one of the second pin members when the guide bar is in the radially outward position. Insertion of a mating key into the keyway causes the first and second pin members to translate in a direction that is generally transverse to the first axis such that the mating lock elements are aligned to the at least one lock element on the lock bar so that the lock bar may translated to the second position to permit the plug assembly to be rotated relative to the lock cylinder body. The mating key may be removed from the plug assembly when the guide bar is positioned in the radially outward position In another form, the teachings of the present invention provide a method for re-keying a lockset that includes: providing a lockset having a lock cylinder body and a plug assembly, the plug assembly including a plurality of first pin members and a plurality of second pin members, each of the first pin members being coupled to an associated one of the second pin members to inhibit relative translation therebetween along a first axis; positioning the second pin members in a predetermined orientation; uncoupling the first pin members from the second pin members to permit relative translation therebetween along the first axis; inserting a key with a desired key profile to the plug assembly, the desired key profile being operable for repositioning at least one of the first pin members relative to a respective one the second pin members along the first axis; and re-coupling each of the first pin members to the associated one of the second pin members to thereby inhibit relative translation therebetween along the first axis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE VARIOUS EMBODIMENTS

Figure 1:
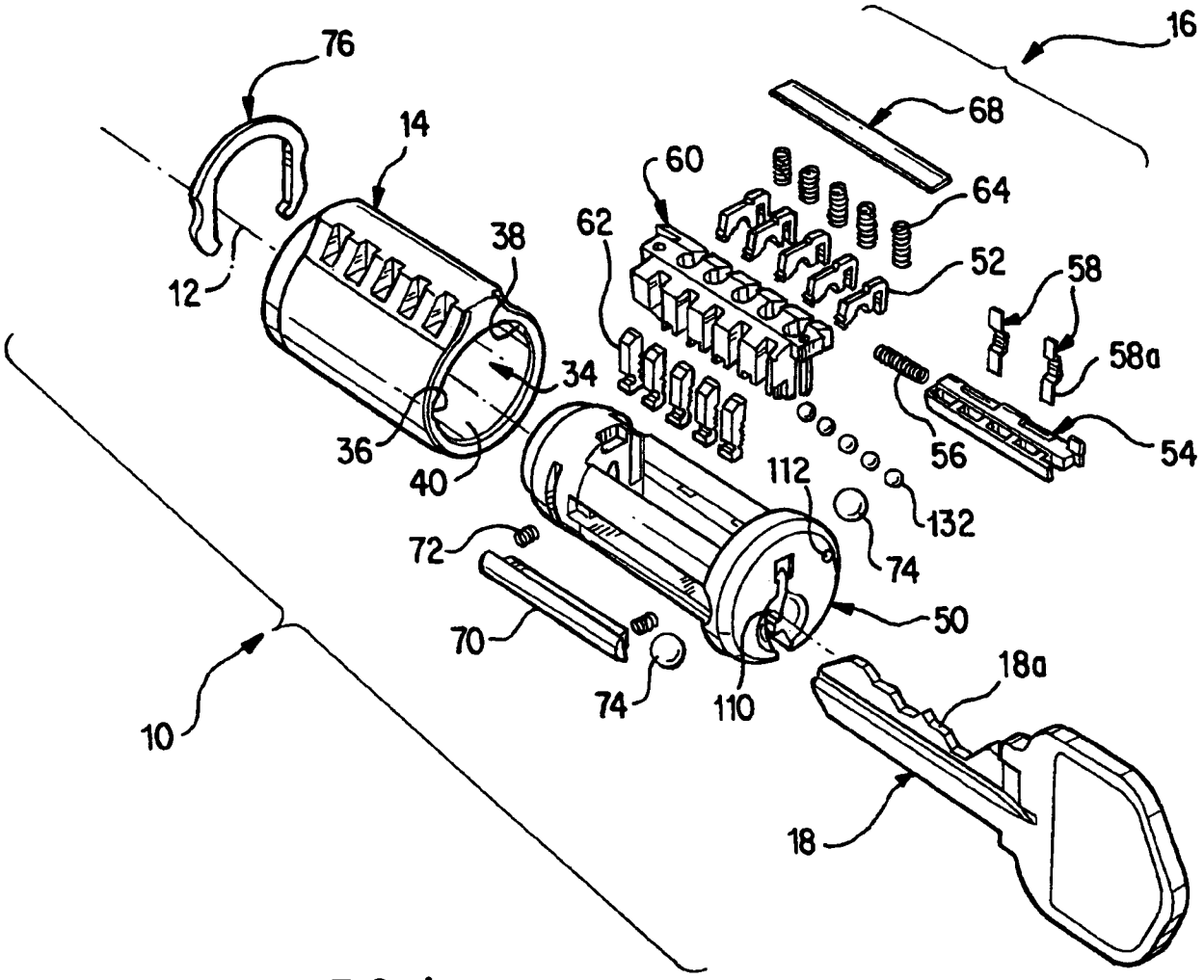
FIG. 1 is an exploded perspective view of a lock cylinder constructed in accordance with the teachings of the present invention.
Figure 2:
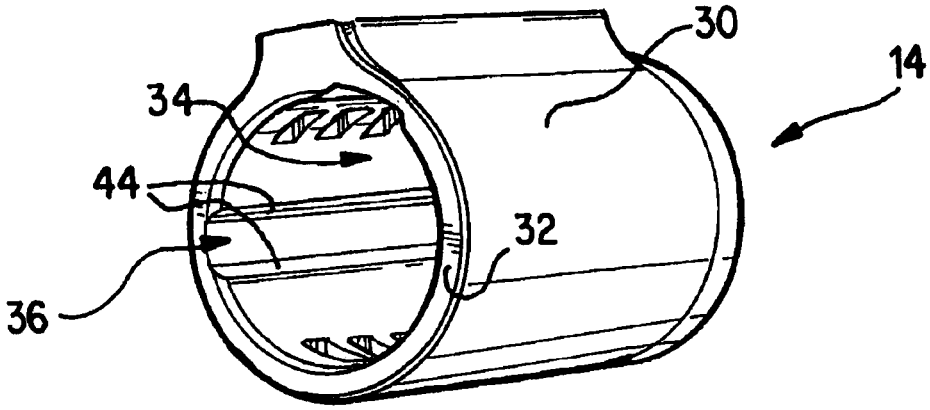
FIG. 2 is a perspective view of a portion of the lock cylinder of FIG. 1 illustrating the lock cylinder body in greater detail.
Figure 3:
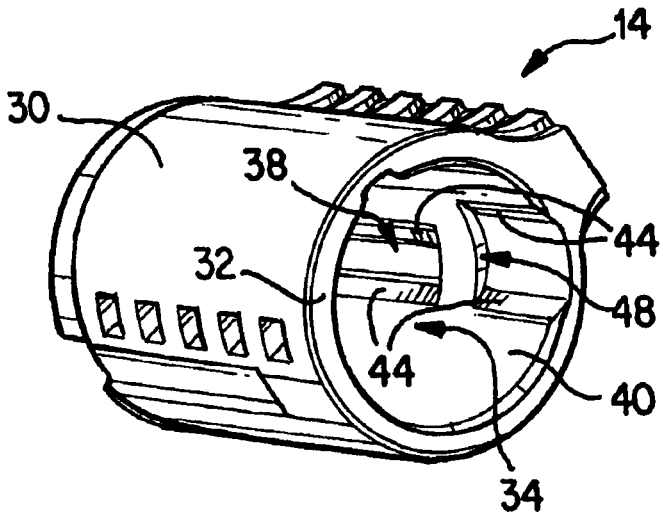
FIG. 3 is another perspective view of the lock cylinder body.

With reference to FIG. 1 of the drawings, a lock cylinder constructed in accordance with the teachings of the present invention is generally indicated by reference numeral 10. The lock cylinder 10 is disposed about a longitudinal axis 12 and may include a lock cylinder body 14, a plug assembly 16 and a "matched" key 18. With additional reference to FIGS. 2 and 3, the lock cylinder body 14 may include a generally cylindrical body portion 30 with a wall member 32 that defines an interior cavity 34. First and second grooves 36 and 38, respectively, are formed in the interior surface 40 of the wall member 32. Arcuate cam surfaces 44 may be formed on one or both of the opposite sides of the first and/or second grooves 36, 38. The cylindrical body portion 30 may include a bridge member 48 that may intersect the second groove 38. In the particular example provided, the bridge member 48 has a radially inward surface that extends further into the interior cavity 34 than the deepest part of the second groove 38.

Returning to FIG. 1, the plug assembly 16 may include a plug 50, a plurality of bottom pins 52, a guide bar 54, a first guide bar spring 56, a second guide bar spring 58, a cover 60, a plurality of racks 62, a plurality of pin springs 64, a spring cap 68, a locking bar 70, a lock bar spring 72, one or more drill-resistant elements, such as ball bearings 74, and a retainer 76.

Figure 4:
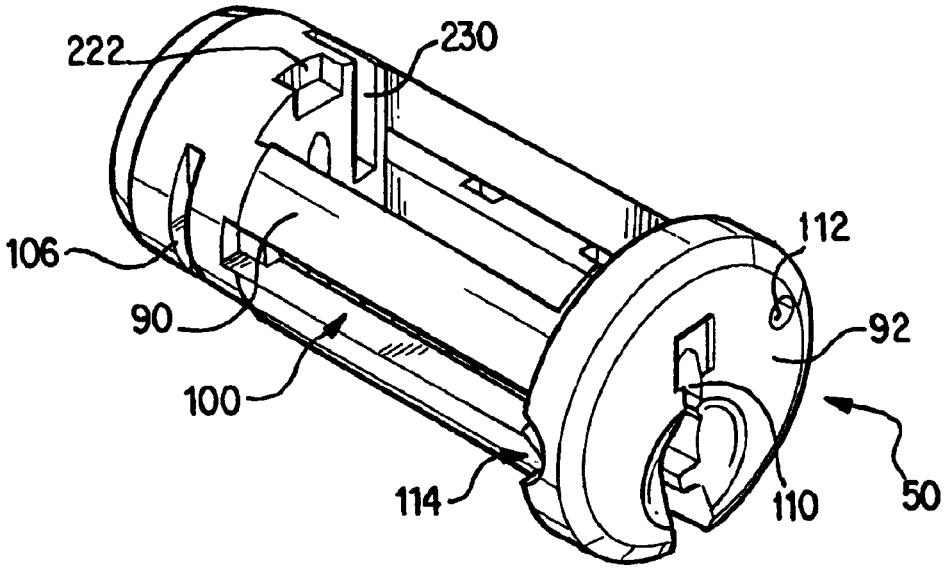
FIG. 4 is a perspective view of a portion of the lock cylinder of FIG. 1 illustrating the plug in greater detail.
Figure 5:
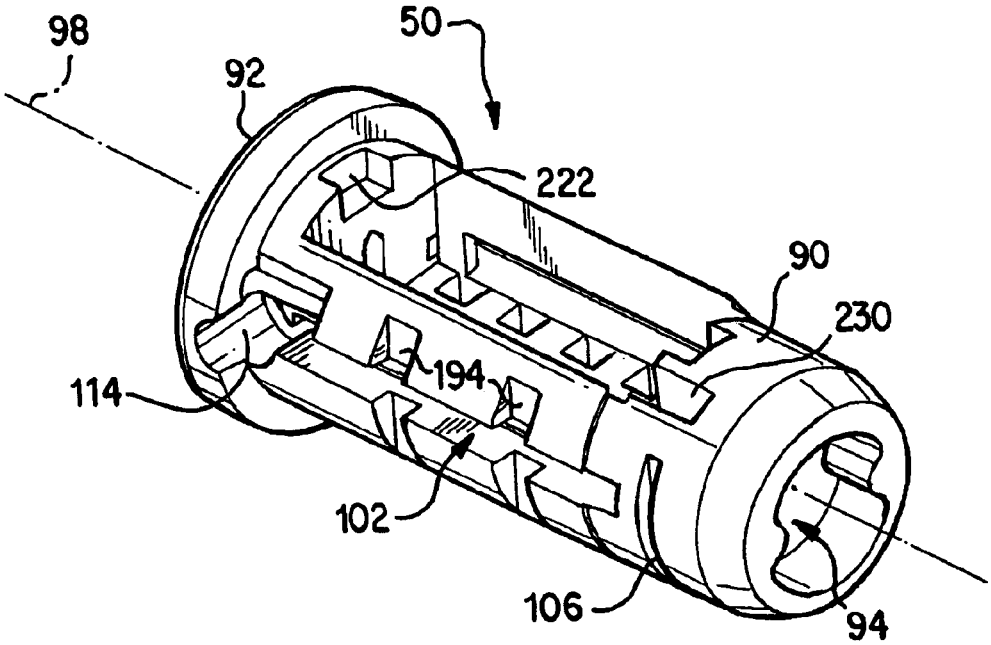
FIG. 5 is another perspective view of the plug.
Figure 7:
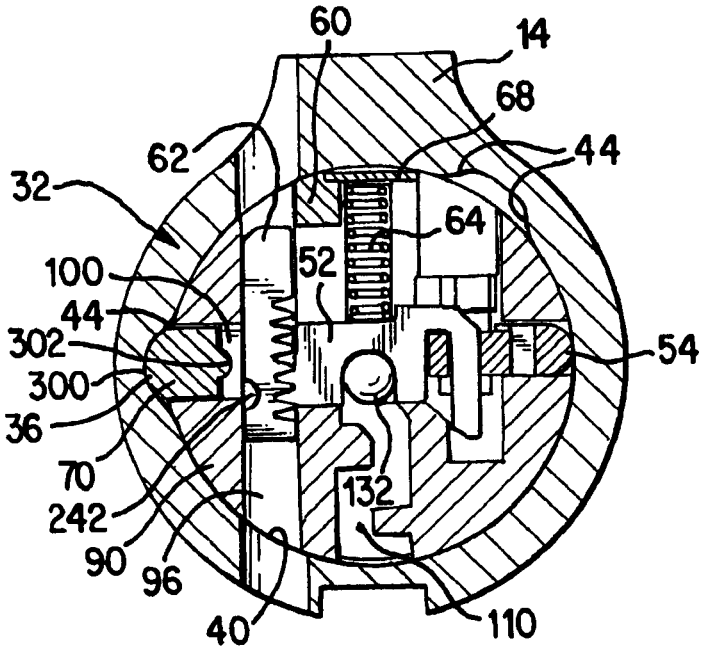
FIG. 7 is a sectional view taken through the lock cylinder of FIG. 1.

With additional reference to FIGS. 4, 5 and 7, the plug 50 may include a plug body 90 and a plug face 92. The plug body 90 may be sized to be received through the interior cavity 34 of the lock cylinder body 14 and may include a central cavity 94 that may include one or more first rack slots 96 for receiving a portion of the racks 62. The first rack slots 96 may extend generally transverse to a longitudinal axis 98 of the plug body 90. A lock bar slot 100 may extend longitudinally along the plug body 90 and may intersect the first rack slots 96. A guide bar slot 102 may extend longitudinally along the plug body 90 and may intersect the central cavity 94. The lock bar slot 100 and the guide bar slot 102 may be generally diametrically opposed from one another. Retainer slots 106 may be formed in the plug body 90 for receiving the retainer 76. In the particular example provided, the retainer 76 is a conventional C-shaped spring clip that is received into the retainer slots 106 and which engages the portion of the plug body 90 that extends through the lock cylinder body 14 to thereby inhibit withdrawal of the plug body 90 from the lock cylinder body 14. Those skilled in the art will appreciate from this disclosure that the plug 50 and the lock cylinder body 14 may be rotatably coupled to one another in any appropriate manner.

A keyway 110 extends through the plug face 92 and into the central cavity 94. The plug face 92 may include a re-keying tool opening 112, which may be offset somewhat from the guide bar slot 102. Cavities 114 may be formed in the plug face 92 and/or the plug body 90 for receiving the drill resistant elements. In the particular example provided, the cavities 114 are formed in both the plug face 92 and the plug body 90 and are positioned such that the drill resistant ball bearings 74 are located axially in-line with the lock bar slot 100 and the guide bar slot 102.

Figure 6:
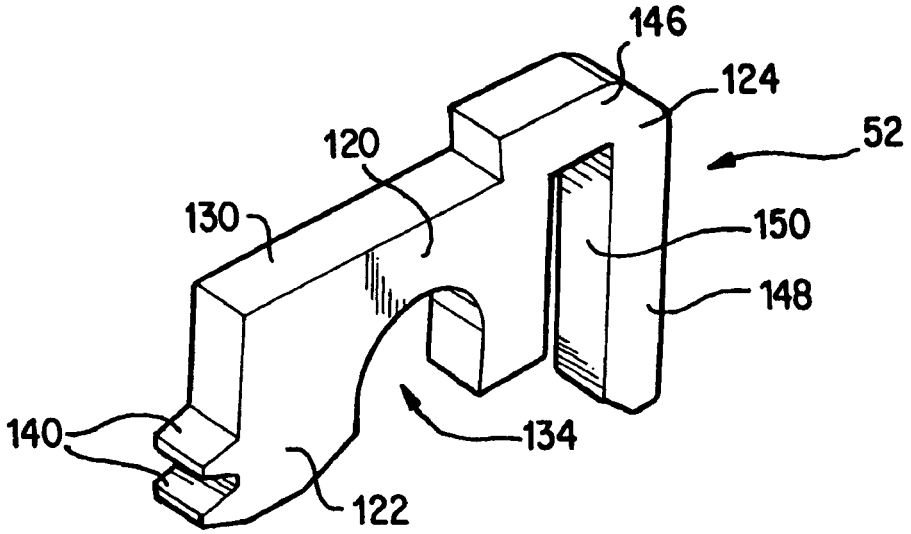
FIG. 6 is a perspective view of a portion of the lock cylinder of FIG. 1 illustrating the bottom pin in greater detail.

With reference to FIGS. 1, 6 and 7, each bottom pin 52 may include a key-engaging portion 120, a first securing portion 122 and a coupling portion 124. The key-engaging portion 120 may include an upper surface 130 and a contact member 132. The contact member 132 provides the lockset 10 with improved resistance to the wear that is normally encountered through the insertion of the key to and withdrawal of the key from the keyway 110. The contact member 132 may be unitarily formed with the remainder of the bottom pin 52, or may comprise one or more discrete elements that are associated with the remainder of the bottom pin 52. In the particular example provided, the contact member 132 is a conventional hardened ball bearing and is disposed in a slotted aperture 134 that is formed in the remainder of the bottom pin 52.

The first securing portion 122 is configured to slide against and engage an associated one of the racks 62. In the particular example provided, we employed one or more teeth 140 which are coupled to and extend from the key-engaging portion 120. The teeth 140 are illustrated as being generally V-shaped and aligned along an axis that is generally parallel to the longitudinal axis of the bottom pin 52, but those skilled in the art will appreciate from this disclosure that the tooth or teeth 140 may be formed and/or oriented differently from that which is shown and described.

The coupling portion 124 may be coupled to the key-engaging portion 120 on a side opposite the first securing portion 122 and is configured to couple the bottom pin 52 to the guide bar 54. In the particular example provided, the coupling portion 124 is generally L-shaped, having an arm 146, which may be generally parallel to the longitudinal axis of the bottom pin 52, and a leg 148 that may be generally perpendicular to the arm 146. The leg 148 is spaced apart from the key-engaging portion 120 so as to form a guide receiving aperture 150.

Figure 8:
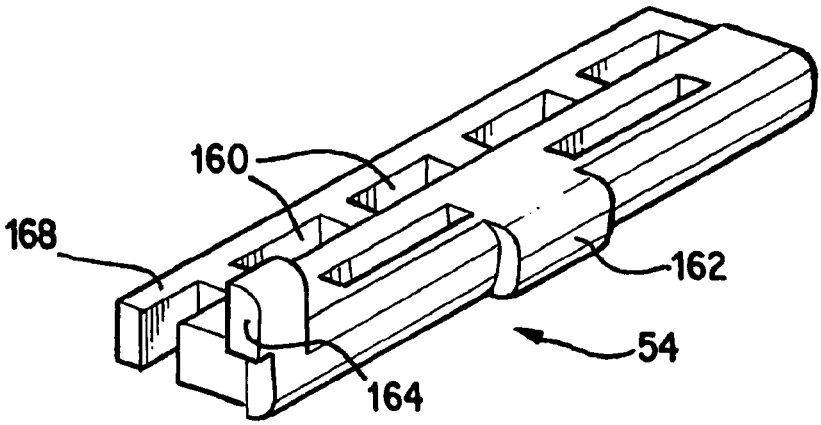
FIG. 8 is a perspective view of a portion of the lock cylinder of FIG. 1 illustrating a portion of the guide bar in greater detail.

With reference to FIGS. 1, 7 and 8, the guide bar 54 may be a longitudinally extending member that may be disposed between the cover 60 and the plug body 90 and may be slidable relative to the plug body 90 in a first direction, which is generally parallel to the longitudinal axis of the plug body 90, and a second direction, which is generally perpendicular to the longitudinal axis of the plug body 90. The guide bar 54 may include one or more coupling apertures 160, a setting cam 162, and a setting tab 164. Each coupling aperture 160 may be formed through the guide bar 54 so as to form a wall member 168 that is sized to engage the coupling portion 124 of an associated one or ones of the bottom pins 52. In the particular example provided, the guide bar 54 includes five coupling apertures 160, one for each of the bottom pins 52. More specifically, in the particular example provided the guide bar 54 is received into the guide receiving aperture 150 in the coupling portion 124 of each bottom pin 52 such that the leg 148 is disposed in an associated one of the coupling apertures 160 to thereby "lock" the guide bar 54 to the bottom pins 52 in a lateral direction. The coupling apertures 160 may be sized relatively wider than the bottom pins 52 so as to permit translation of the guide bar 54 relative to the bottom pins 52 in a direction generally parallel to the longitudinal axis 98 of the plug body 90. Those skilled in the art will appreciate from this disclosure, however, that one or more of the coupling apertures 160 may be sized in the alternative to receive a plurality of the bottom pins 52.

The setting cam 162 may extend from a lateral side of the guide bar 54 opposite the coupling apertures 160 and may be configured to cooperate with one or more other elements, such as the lock cylinder body 14, to permit the setting cam 162 to engage and/or disengage the bottom pins 52 to the racks 62. In the particular example provided, alignment of the setting cam 162 to the radially inward surface of the bridge member 48 (FIG. 3) maintains engagement between the bottom pins 52 and the racks 62, whereas alignment of the setting cam 162 to the second groove 38 (FIG. 3) permits the guide bar 54 to be shifted radially outwardly so that the bottom pins 52 disengage the racks 62.

The setting tab 164 provides a location on the guide bar 54 at which a user may apply a force to shift the guide bar 54 relative to the lock cylinder body 14. The setting tab 164 may be offset somewhat from the setting cam 162 so that the setting cam 162 may be positioned behind a drill resistant ball bearing 74. In the particular example provided, the setting tab 164 is generally L-shaped and extends above the setting cam 162 so as to be aligned with the re-keying tool opening 112.

With reference to FIGS. 1, 5, 7 and 17, the first guide bar spring 56 biases the guide bar 54 toward the plug face 92 in the first direction (i.e., in a direction generally parallel to the longitudinal axis 98 of the plug body 90), while the second guide bar spring 58 biases the guide bar 54 in the second direction (i.e., in a direction outwardly from the plug body 90 away from the racks 62). In the example provided, the first guide bar spring 56 is a compression spring that is disposed in a spring aperture 190 that is formed in the plug body 90, while the second guide bar spring 58 includes a pair of leaf springs 58a, each of which being disposed in a spring slot 194 that is formed in the plug body 90 and which intersects the guide bar slot 102.

With reference to FIGS. 1, 7, 9 and 10, the cover 60 may include a plurality of pin slots 200, a plurality of second rack slots 202, and a plurality of guide tabs 204. The cover 60 may also include a longitudinally extending aperture 206 that may form a portion of the keyway 110. The pin slots 200 may have a first portion 210, which may be generally transverse to the longitudinal axis and vertically in-line with the keyway 110, and a second portion 212. In the particular example provided, the second portion 212 of each the pin slot 200 is generally normal to an associated first portion 210 of the pin slot 200 and extends sufficiently through the cover 60 as to intersect an associated one of the second rack slots 202. The first portion 210 of each pin slot 200 is sized to receive therein an associated one of the pin springs 64, while the second portion 212 is sized to receive an associated one of the bottom pins 52. The pin springs 64 are configured to bias the bottom pins 52 downwardly in the pin slots 200. In the particular example provided, each pin spring 64 is a compression spring that is disposed between the spring cap 68 and the upper surface 130 of the key-engaging portion 120 of the bottom pin 52. Each of the second rack slots 202 may be generally parallel to the first portion 210 of an associated one of pin slots 200. The first and second rack slots 96 and 202 cooperate to define a cavity into which an associated one of the racks 62 may be received.

The guide tabs 204 may extend from the opposite ends of the cover 60 and may be employed to secure the cover 60 to the plug body 90. In the particular example provided, each guide tabs 204 includes a longitudinally extending tab member 220 that may be received into an associated tab member cavity 222 (FIG. 5) in the plug body 90. An aperture may be formed through each tab member 226 to receive therethrough a rivet, pin or threaded fastener to secure the tab member 220 to the plug body 90. In the particular embodiment illustrated, the rearward guide tab 204 also includes a cross-tab 228, which may be disposed generally perpendicular to the tab member 220 and which may be sized to engage an associated cross-tab cavity 230 (FIG. 5) formed in the plug body 90.

Figure 9:
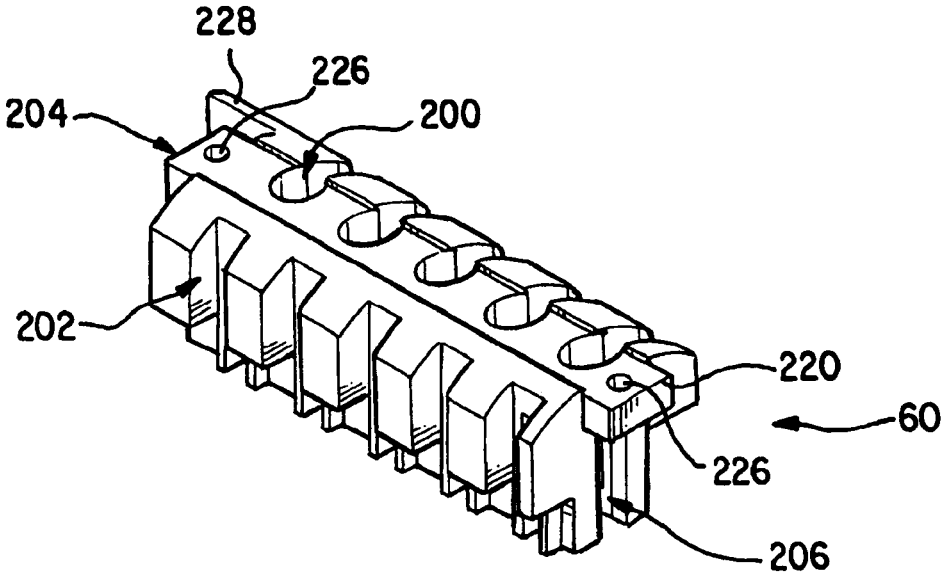
FIG. 9 is a perspective view of a portion of the lock cylinder of FIG. 1 illustrating the cover in greater detail.
Figure 10:
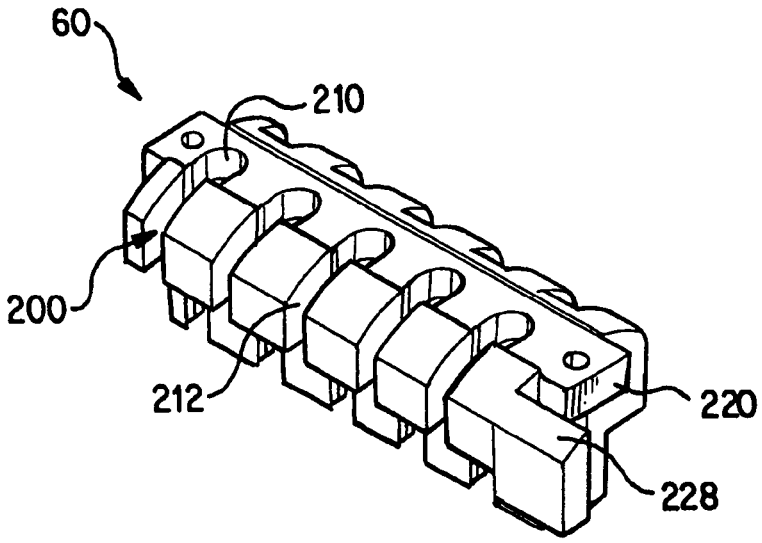
FIG. 10 is another perspective view of the cover.
Figure 11:
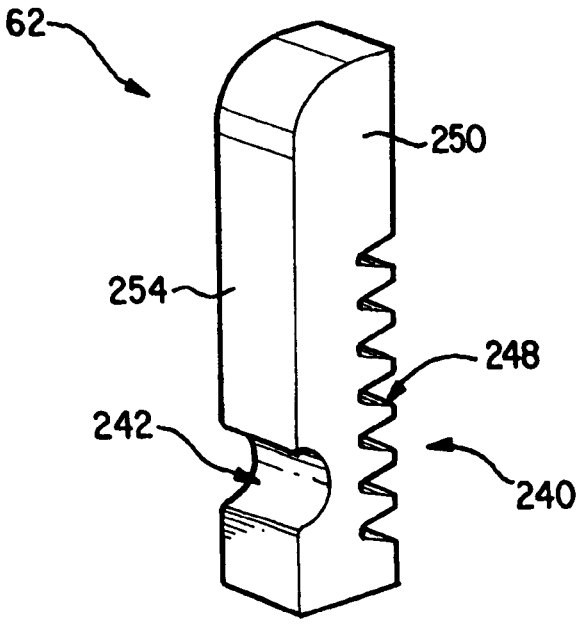
FIG. 11 is a perspective view of a portion of the lock cylinder of FIG. 1 illustrating the rack in greater detail.

With reference to FIGS. 1, 7 and 11, each rack 62 may be an elongated member that is slidingly disposed in an associated pair of the first and second rack slots 96 and 202 (FIG. 9). Each rack may have a second securing portion 240 and a mating lock element 242. The second securing portion 240 is configured to cooperate with the first securing portion 122 of an associated one of the bottom pins 52 so that when the first and second securing portions 122 and 240 are engaged to one another, the key-engaging portion 120 of the bottom pin 52 may be maintained at a desired position relative to the rack 62. In the particular example provided, the rack 62 includes a plurality of rack teeth 248 that are spaced apart along a portion of the length of the rack 62 and that have a tooth geometry that is compatible with the tooth geometry of the teeth 140 of the first securing portion 122 on the bottom pins 52. The upper end 250 of the rack 62 may be contoured so as not to contact the interior surface 40 of the lock cylinder body 14 during the operation of the lock cylinder 10.

The mating lock element 242 is formed in a surface 254 of the rack 62 that abuts the locking bar 70. In the particular example provided, the mating lock element 242 is an aperture in the abutting surface 254 having the shape a cylindrical segment that passes through the rack 62 in a direction that is generally perpendicular to the longitudinal axis of the rack 62.

The spring cap 68, which is optional, provides a wear-resistant barrier between the pin springs 64 and the wall member 32 of the lock cylinder body 14. Accordingly, the spring cap 68 may comprise one or more elements that are interposed between the pin springs 64 and the wall member 32 and retain the pin springs 64 within the first portion 210 of the pin slots 200 that are formed in the cover 60. The spring cap 68 may be coupled to the cover 60 via fasteners, such as rivets or threaded fasteners, or utilize a geometrical shape (e.g., a pair of longitudinally extending grooves into which the opposite lateral edges of the spring cap 68 are received) that permits the spring cap 68 to be received into and locked to the cover 60. In the particular example provided, the spring cap 68 is unitarily formed and is sized to cover the first portion 210 of each pin slots 200 in the cover 60. Additionally, rivets, pins and/or threaded fasteners (not shown) may be employed to couple the opposite ends of the spring cap 68 to the cover 60 and the plug body 90 (i.e., the rivets, pins and/or threaded fasteners may be employed to secure both the spring cap 68 and the cover 60 to the plug body 90).

Figure 12:
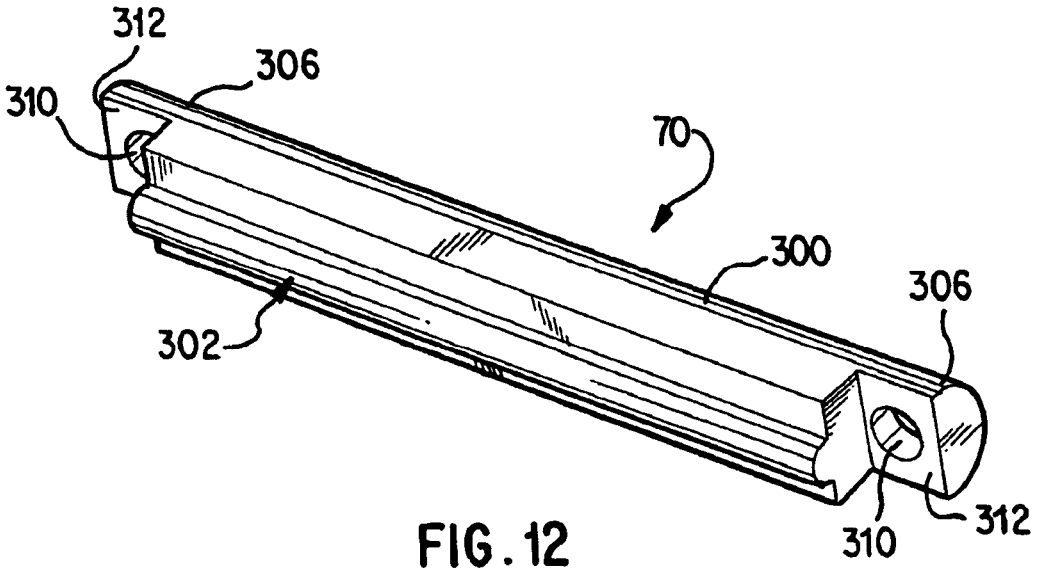
FIG. 12 is a perspective view of a portion of the lock cylinder of FIG. 1 illustrating the lock bar in greater detail.

With reference to FIGS. 1, 7 and 12, the locking bar 70 is an elongate member that is sized to be at least partially received into the lock bar slot 100. The locking bar 70 may include a cam follower 300 and one or more lock elements 302. In the particular example provided, the cam follower 300 extends the length of the locking bar 70 and is arcuate in shape. Also in the particular example provided, the lock element 302 is sized to be slidably received into the mating lock elements 242 that are formed in the racks 62 and may be somewhat shorter than the locking bar 70 so that the cam follower 300 forms a pair of ears 306, with each ear 306 being located adjacent an opposite end of the lock element 302.

The lock bar spring 72 may be disposed between the locking bar 70 and the plug body 90 to bias the locking bar 70 outwardly from the racks 62 toward the interior surface 40 of the wall member 32 of the lock cylinder body 14. In the example provided, the lock bar spring 72 comprises a pair of compression springs, each of which being disposed in a recess 310 that is formed on an inside surface 312 of an associated one of the ears 306.

With reference to FIGS, 1 and 7, the pin springs 64 bias the bottom pins 52 downwardly in the keyway 110, while the lock bar spring 72 biases the locking bar 70 radially outwardly from the plug body 90 into the first groove 36 in the wall member 32 of the lock cylinder body 14.

Figure 13:
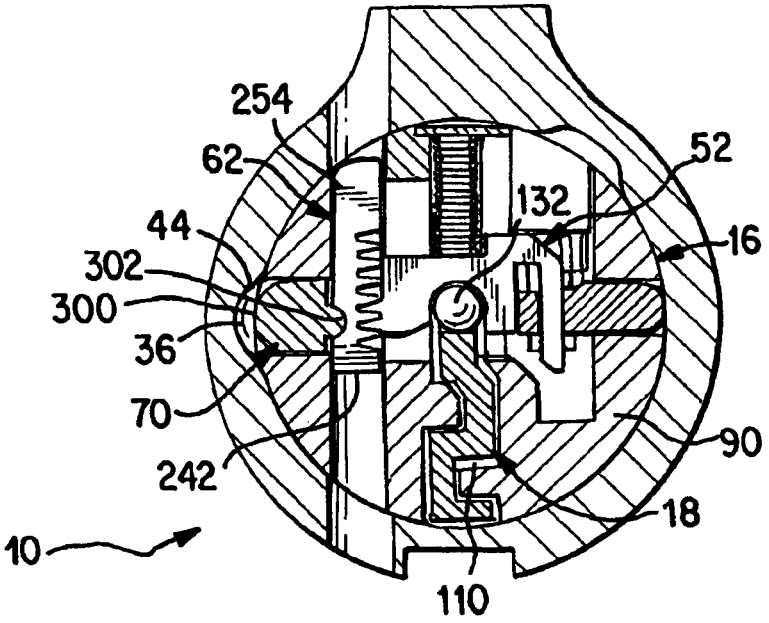
FIG. 13 is a sectional view similar to that of FIG. 7, but illustrating a matched key inserted to the keyway.
Figure 14:
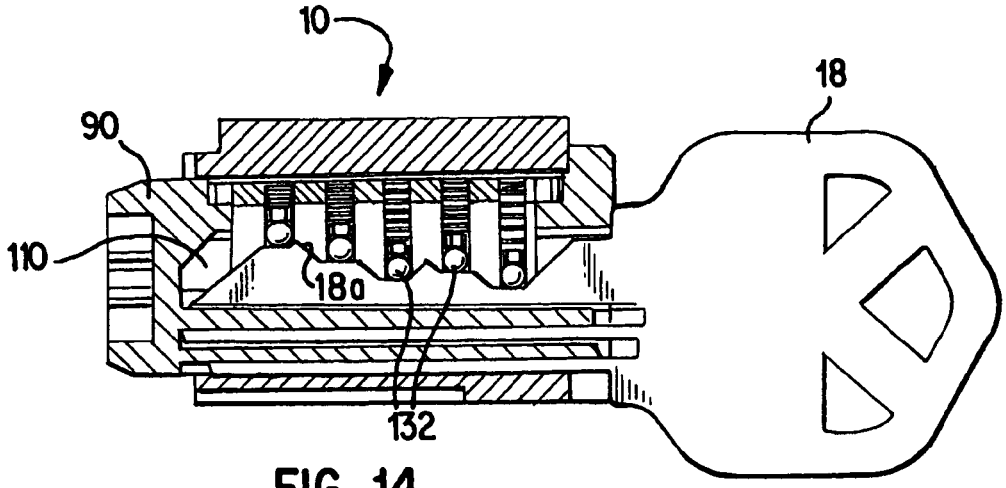
FIG. 14 is a longitudinal section view of the lock cylinder of FIG. 1 illustrating the matched key inserted to the keyway.
Figure 15:
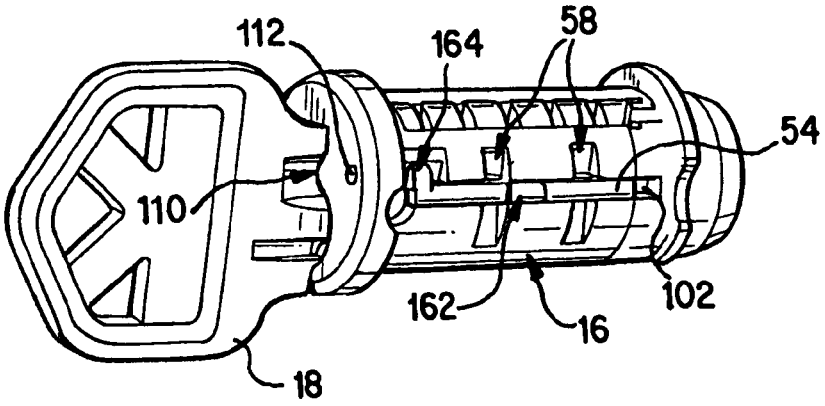
FIG. 15 is a perspective view of a portion of the lock cylinder of FIG. 1 illustrating the matched key inserted into the plug assembly.

With additional reference to FIGS. 13 and 14, the key 18 that is associated with the lock cylinder 10 has a lateral cross-sectional shape that matches or is compatible with that of the keyway 110 and a key profile 18a. Insertion of the key 18 into the keyway 110 brings the key profile 18a into contact with the contact member 132 of each bottom pin 52, causing the bottom pins 52 and the racks 62 (since each of the bottom pins 52 is engaged to an associated one of the racks 62) to move "upwardly" in the example provided.

If the key 18 is "matched" to the current keying of the lock cylinder 10, each of the racks 62 will be moved relative to the plug body 90 such that the mating lock elements 242 are aligned to the lock element(s) 302 on the locking bar 70. Rotation of the key 18, which causes rotation of the plug assembly 16 relative to the lock cylinder body 14, causes the cam follower 300 of the locking bar 70 to ride against the cam surface 44 on the first groove 36 so that the locking bar 70 is pushed radially inwardly toward the plug body 90. Since the key 18 is matched to the lock cylinder 10, the lock element 302 will at least partially engage the mating lock element 242 so that the cam follower 300 may move inwardly by a sufficient amount so as to permit the plug body 90 to rotate in an unimpeded manner within the interior cavity 34 of the lock cylinder body 14. If the key 18 were not matched to the lock cylinder 10, the lock element 302 would move inwardly in response to rotation of the plug assembly 16 relative to the lock cylinder body 14 and would contact the abutting surface 254 of at least one of the racks 62. Such contact would effectively inhibit inward movement of the cam follower 300 so that the locking bar 70 would remain in the first groove 36 and thereby inhibit further rotation of the plug assembly 16 relative to the lock cylinder body 14.

Figure 16:
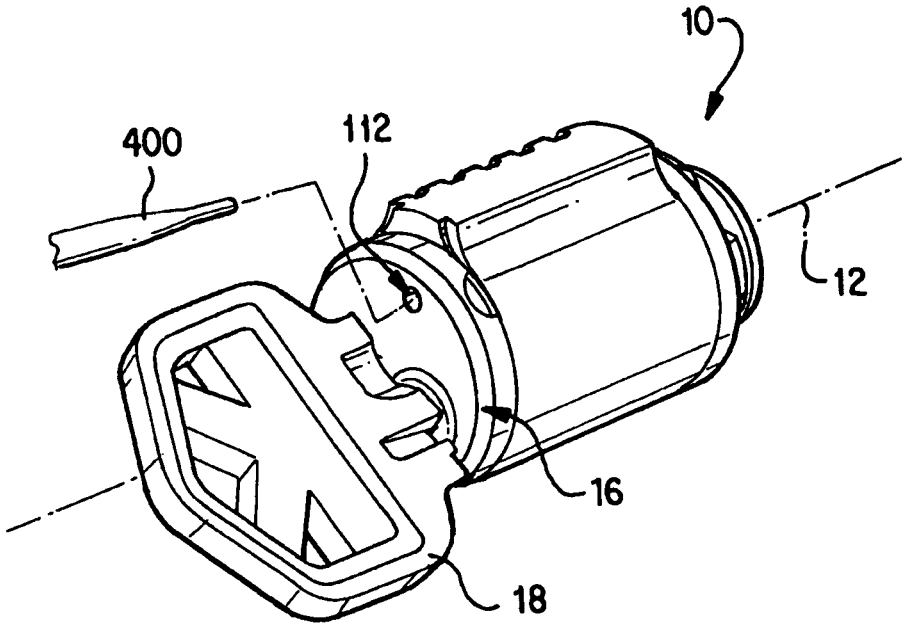
FIG. 16 is an perspective view illustrating the lock cylinder of FIG. 1 in association with a re-keying tool.
Figure 18:
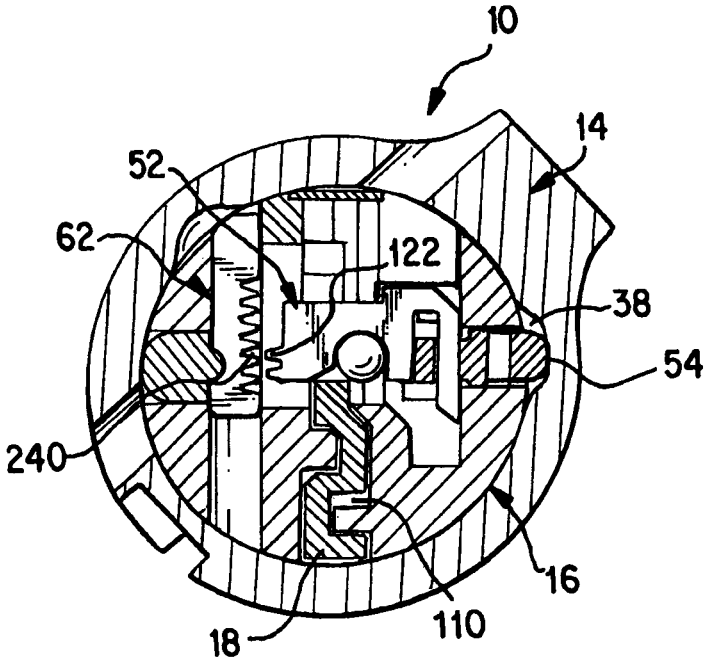
FIG. 18 is a sectional view similar to FIG. 13, but illustrating the guide bar shifted relative to the lock cylinder body.
Figure 17:
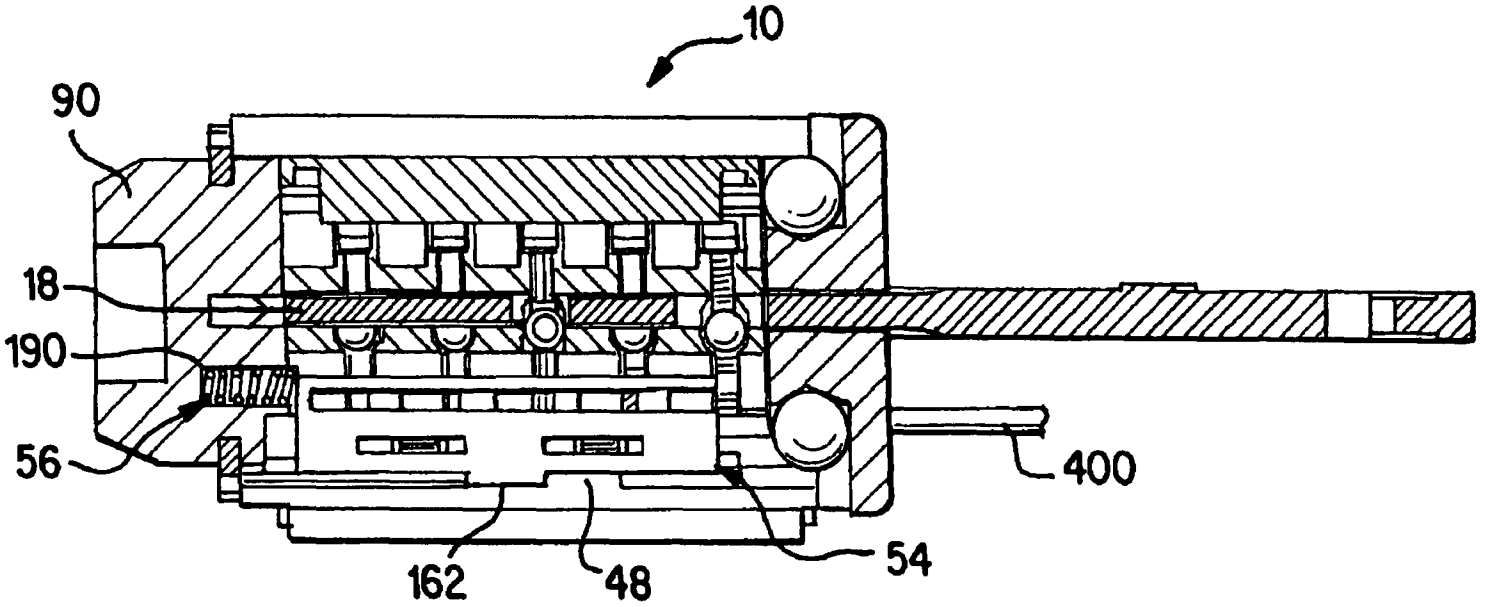
FIG. 17 is a longitudinal section view of the lock cylinder of FIG. 1 illustrating the guide bar shifted relative to the lock cylinder body.

One method for re-keying the lock cylinder 10 will be described in conjunction with FIGS. 15 through 18. To re-key the lock cylinder 10, a key 18 that is matched to the lock cylinder 10 may be inserted into the keyway 110 and the plug assembly 16 rotated relative to the lock cylinder body 14 through a predetermined angle, such as 45°, to align the guide bar 54 to the second groove 38 in the lock cylinder body 14. Contact between the setting cam 162 and the radially inward surface of the bridge member 48 maintains the guide bar 54 in a position wherein the bottom pins 52 are engaged to their respective racks 62. A re-keying tool 400 is inserted into the re-keying tool opening 112 and is employed to exert a force onto the setting tab 164 (FIG. 8) that pushes the guide bar 54 in the guide bar slot 102 (FIG. 5) away from the re-keying tool opening 112 so that the setting cam 162 rides across the bridge member 48. When the bridge member 48 is aligned to the second groove 38 (i.e., has ridden over the bridge member 48 as shown in FIG. 17), the second guide bar spring 58 urges the guide bar 54 in an outward direction. As the bottom pins 52 are coupled to the guide bar 54 for movement in a direction generally perpendicular to the longitudinal axis 12 of the lock cylinder 10, movement of the guide bar 54 in an outward direction causes the first securing portion 122 of the bottom pins 52 to disengage the second securing portion 240 of the racks 62.

Figure 19:
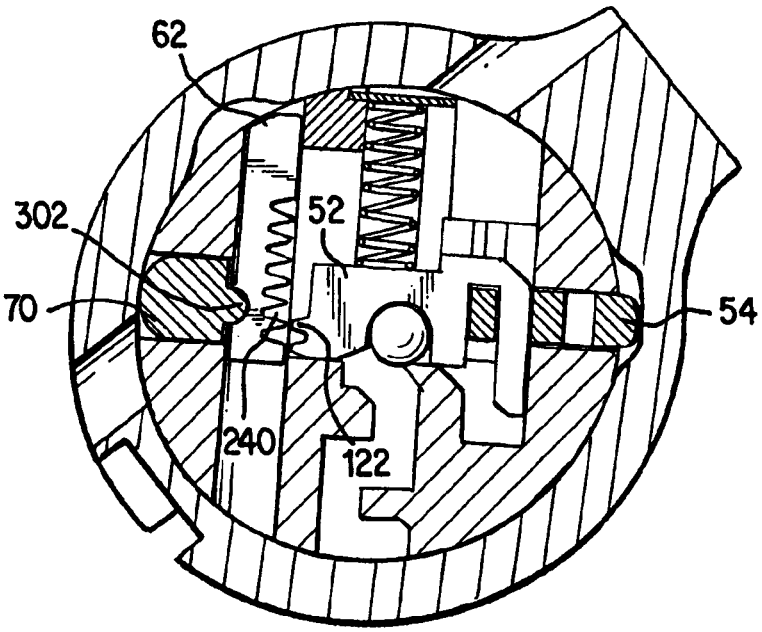
FIG. 19 is a sectional view similar to FIG. 18, but illustrating the lock cylinder without the original matched key.
Figure 20:
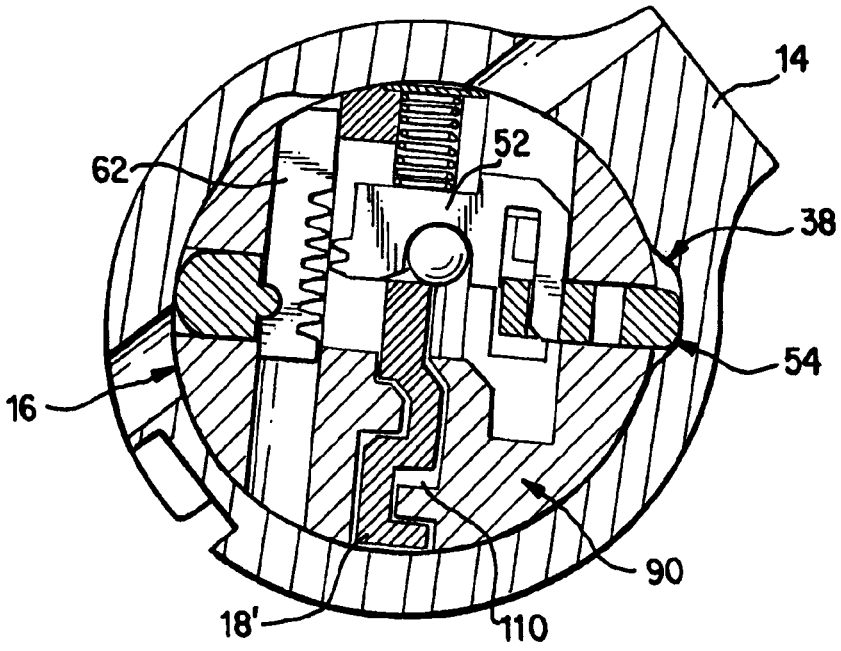
FIG. 20 is a sectional view similar to FIG. 19, but illustrating a "new" key installed to the keyway.
Figure 21:
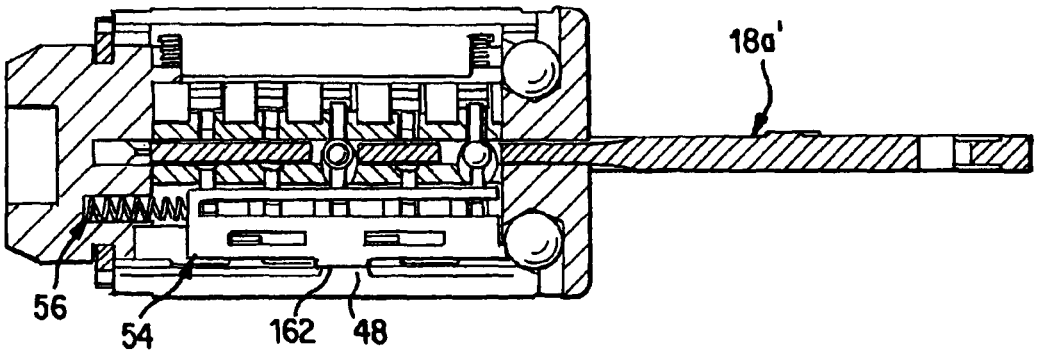
FIG. 21 is a longitudinal section view similar to FIG. 17, but illustrating the guide bar in a returned position relative to the lock cylinder body.
Figure 22:
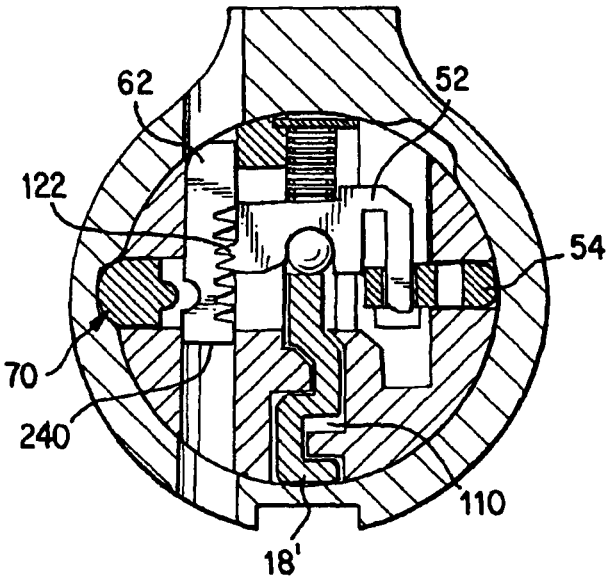
FIG. 22 is a sectional view similar to FIG, 20, but illustrating the plug assembly in a re-keyed state.

At this point, the key 18 may be removed as shown in FIG. 19 and another, differently configured key 18' may be inserted into the keyway 110, as shown in FIG. 20, which causes the bottom pins 52 to move "upwardly" in the keyway 110 in an amount that corresponds to the configuration of the key 18'. Force on the re-keying tool 400 (FIG. 16) may be reduced or eliminated to permit the first guide bar spring 56 (FIG. 17) to push the guide bar 54 in the guide bar slot 102 (FIG. 21) toward the re-keying tool opening 112 (FIG. 16). As the guide bar 54 moves toward the re-keying tool opening 112 (FIG. 16), the setting cam 162 rides up onto the bridge member 48, which forces the guide bar 54 inwardly. Since the bottom pins 52 are coupled to the guide bar 54 for movement in a direction generally perpendicular to the longitudinal axis 12 of the lock cylinder 10, movement of the guide bar 54 in an inward direction causes the first securing portion 122 of the bottom pins 52 to engage the second securing portion 240 of the racks 62 as shown in FIG. 22. The engagement of the bottom pins 52 to the racks 62 while the locking bar 70 is engaged to the racks 62 "matches" the new key 18' to the lock cylinder 10.

Figure 23:
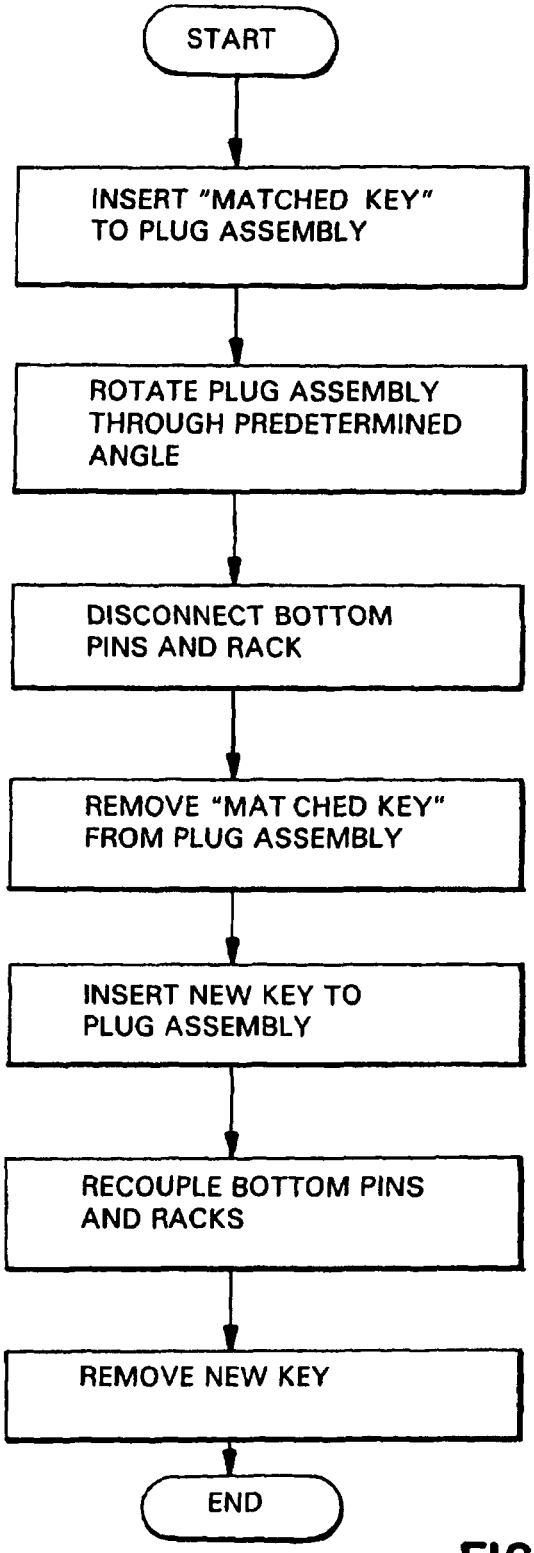
FIG. 23 is a schematic illustration in flow chart form of a methodology performed in accordance with the teachings of the present invention.

With reference to FIG. 23, a method for re-keying a lock in accordance with the teachings of the present invention is illustrated schematically in flow chart form. The methodology includes the steps of: inserting a "matched" key 18 to the plug assembly 16; rotating the plug assembly 16 relative to the lock cylinder body 14 through a predetermined angle of rotation; disconnecting the bottom pins 52 from the racks 62; removing the key 18 from the plug assembly 16; inserting a new key 18' to the plug assembly 16; re-coupling the bottom pins 52 to the racks 62; and removing the new key 18'.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for re-keying a lockset comprising:

providing a lockset having a [look] *lock* cylinder body[, a first axis,] and a plug assembly *having a first axis*, the plug assembly including a guide bar and a plurality of first pin members and a plurality of second pin members, each of the first pin members being coupled to an associated one of the second pin members to inhibit relative movement therebetween along the first axis *of the plug assembly*;

inserting a first key with a first key profile to the plug assembly to align the second pin members in a predetermined orientation;

rotating the plug assembly relative to the lock cylinder body to maintain the second pin members in the predetermined orientation;

moving the guide bar parallel to the first axis;

moving the guide bar transverse to the first axis to uncouple the first pin members from the second pin members to permit relative movement therebetween along the first axis;

removing the first key from the plug assembly;

inserting a second key with a second key profile [to] *into* the plug assembly to reposition at least one of the first pin members relative to a respective one of the second pin members along [the] *a* first [axis] *direction relative to the plug assembly*, the second key profile being different than the first key profile;

re-coupling each of the first pin members to the associated one of the second pin members.

2. The method of claim 1 wherein the plug assembly is rotated through a predetermined angle relative to the lock cylinder body prior to uncoupling the first pin members from the second pin members.

3. The method of claim 2 wherein rotation of the plug assembly through the predetermined angle radially locates said guide bar to a groove that is formed in the lock cylinder body and wherein uncoupling the first pin members from the second pin members is effected by moving the guide bar into the groove.

4. The method of claim 3, wherein maintenance of the second pin members in the predetermined orientation is effected through engagement of a lock bar to the second pin members.

5. A method for re-keying a lockset comprising:

providing a lockset having a lock cylinder body and a plug assembly, the plug assembly including a plurality of first pin members and a plurality of second pin members, each of the first pin members being coupled to an associated one of the second pin members to inhibit relative translation therebetween along a first axis;

inserting a first key with a first key profile to the plug assembly to align the second pin members in a predetermined orientation;

rotating the plug assembly relative to the lock cylinder body to maintain the second pin members in the predetermined orientation;

uncoupling the first pin members from the second pin members to permit relative translation therebetween along the first axis;

removing the first key from the plug assembly;

inserting a second key with a second key profile to the plug assembly to reposition at least one of the first pin members relative to a respective one of the second pin members along the first axis, the second key profile being different than the first key profile; and re-coupling each of the first pin members to the associated one of the second pin members to thereby inhibit relative translation therebetween along the first axis;

wherein the plug assembly is rotated through a predetermined angle relative to the lock cylinder body prior to uncoupling the first pin members from the second pin members, and rotation of the plug assembly through the predetermined angle radially locates a guide bar to a groove that is formed in the lock cylinder body, and uncoupling the first pin members from the second pin members is effected by moving the guide bar into the groove, wherein the plug assembly includes a plug and wherein the guide bar is moved into the groove when a tool that is inserted through a face on the plug is employed to push the guide bar in a direction that is generally parallel to a longitudinal axis of the plug assembly.

*6. A method for re-keying a lockset having a lock cylinder, a plug supported in the lock cylinder for rotation about a longitudinal axis, a pin assembly having a plurality of pin members supported in the plug for sliding movement along a first direction relative to the plug and transverse to the longitudinal axis, a lock bar supported in the plug for sliding movement in a direction transverse to the first direction and a plurality of racks, each of the racks operatively associated with a corresponding one of the plurality of pin members and interposed between the lock bar and the pin assembly so that the lock bar is selectively moveable relative to the plug for allowing rotation of the plug within the lock cylinder, the method comprising:*

*inserting a first key with a first key profile into a slot formed in the plug;*

*rotating the plug relative to the lock cylinder about the longitudinal axis to a re-keying position;*

*moving a guide bar in a direction parallel to the longitudinal axis and parallel to a first axis of the plug which is transverse to the longitudinal axis from a first position to a second position so that the pin assembly is uncoupled from the lock bar to permit relative movement of the plurality of pin members along the first axis;*

*removing the first key from the slot;*

*inserting a second key with a second key profile into the slot, the second key profile being different than the first key profile so that the pin assembly is repositioned relative to the lock bar along the first direction;*

*moving the guide bar from the second position to the first position so that the pin assembly is coupled with the lock bar to inhibit relative movement of the plurality of pin members along the first axis;*

*rotating the plug relative to the lock cylinder about the longitudinal axis to a home position; and*

*removing the second key from the slot.*

*7. The method of claim 6 further comprising inserting a re-keying tool into an access formed in a face of the plug in a direction parallel to the longitudinal axis to engage and move the guide bar.*

*8. The method of claim 7 further comprising biasing the guide bar into the first position when the re-keying tool is removed from the plug.*

*9. The method of claim 6 further comprising moving the guide bar from the first position to the second position to simultaneously uncouple all of the plurality of pin members from the lock bar.*

*10. The method of claim 6 further comprising moving the guide bar within a slot formed in the lock cylinder to uncouple the pin assembly from the lock bar.*

*11. The method of claim 6 further comprising repositioning at least one of the plurality of pin members relative to the rack operatively associated therewith when the second key is inserted into the slot.*

*12. The method of claim 11 further comprising repositioning each of the plurality of pin members relative to the rack operatively associated therewith when the second key is inserted into the slot.*

*13. The method of claim 6 further comprising biasing the plurality of pin members in a direction parallel to the first direction.*

*14. A method for re-keying a lockset comprising:*

*providing a lockset having a lock cylinder body in which a plug assembly rotates about a longitudinal axis, the plug assembly having a first axis and including a guide bar and a plurality of first pin members and a plurality of second pin members;*

*coupling each of the first pin members to an associated one of the second pin members to inhibit relative movement therebetween along a first direction relative to the plug assembly;*

*inserting a first key with a first key profile into the plug assembly to urge the second pin members into a predetermined orientation;*

*rotating the plug assembly relative to the lock cylinder body;*

*moving a portion of the guide bar parallel to the longitudinal axis to permit a portion of the guide bar to move parallel to the first axis that is transverse to the longitudinal axis;*

*uncoupling the first pin members from the second pin members;*

*removing the first key from the plug assembly;*

*inserting a second key with a second key profile into the plug assembly to reposition at least one of the first pin members relative to a respective one of the second pin members along the first direction, the second key profile being different than the first key profile; and*

*re-coupling each of the first pin members to the associated one of the second pin members.*

*15. The method of claim 14, wherein the plug assembly is rotated through a predetermined angle relative to the lock cylinder body prior to uncoupling the first pin members from the second pin members, wherein rotation of the plug assembly through the predetermined angle locates a portion of the guide bar to a groove that is formed in the lock cylinder body and wherein uncoupling the first pin members from the second pin members is effected by moving the guide bar into the groove.*

*16. The method of claim 15 further comprising engaging a lock bar to the second pin members to maintain the second pin members in the predetermined orientation.*

*17. A method for re-keying a lockset having a lock cylinder, a plug supported in the lock cylinder for rotation about a longitudinal axis, a pin assembly having a plurality of pin members supported in the plug for sliding movement along a first axis of the plug transverse to the longitudinal axis, a lock bar supported in the plug for sliding movement in a direction transverse to a first direction relative to the plug and a plurality of racks, each of the racks operatively associated with a corresponding one of the plurality of pin members and interposed between the lock bar and the pin assembly so that the lock bar is selectively moveable relative to the plug for allowing rotation of the plug within the lock cylinder, the method comprising:*

*inserting a first key with a first key profile into a slot formed in the plug;*

*rotating the plug relative to the lock cylinder about the longitudinal axis to a re-keying position;*

*moving a portion of a guide bar in a direction parallel to the longitudinal axis to compress a spring to permit a portion of the guide bar to move parallel to the first axis and uncouple the pin assembly from the lock bar to permit relative movement of the plurality of pin members along the first direction;*

*removing the first key from the slot;*

*inserting a second key with a second key profile into the slot to reposition the pin assembly relative to the lock bar along the first direction, the second key profile being different than the first key profile;*

*moving the guide bar parallel to the first axis to couple the pin assembly with the lock bar to inhibit relative movement of the plurality of pin members along the first direction;*

*rotating the plug relative to the lock cylinder about the longitudinal axis to a home position; and*

*removing the second key from the slot.*

*18. The method of claim 17 further comprising moving the guide bar parallel to the first axis to simultaneously uncouple all of the plurality of pin members from the lock bar.*

*19. The method of claim 17 further comprising moving the guide bar within a slot formed in the lock cylinder to uncouple the pin assembly from the lock bar, repositioning at least one of the plurality of pin members relative to the rack operatively associated therewith when the second key is inserted into the slot, and biasing the plurality of pin members in a direction parallel to the first direction.*

* * * * *